INVENTORS
J.H. AUER JR. AND
L.F. WALDRON JR.
BY
THEIR ATTORNEY

United States Patent Office 3,209,313
Patented Sept. 28, 1965

3,209,313
METHOD AND APPARATUS FOR DETECTING OBJECTS
John H. Auer, Jr., Rochester, N.Y., and Leslie F. Waldron, Jr., Chicago, Ill., assignors to General Signal Corporation, a corporation of New York
Filed Sept. 27, 1962, Ser. No. 226,513
13 Claims. (Cl. 340—1)

This invention relates to a method and apparatus for the detection of objects and more particularly pertains to a method and apparatus for the detection of objects moving over wide expanses of detection area.

Prior detection systems, such as the copending application of J. H. Auer, Jr., Ser. No. 49,294, filed August 12, 1960, have been disclosed wherein repetitive sound pulses are transmitted across the path of a moving object and a desired control is exercised when said sound pulses are reflected back from the object to one or more receiving transducers connected in parallel to a common receiver. The receiver includes gated amplifier means which render the receiver nonresponsive during a period of time at least coincident with the time duration of a transmitted pulse in order to prevent the exercise of a control based upon the direct reception of energy from the transmitter. Immediately following this interval, the gated amplifier establishes a period of controllable duration during which the receiver is rendered responsive and this latter interval encompasses the expected time of reception of reflected pulses from objects passing in the detection zone being monitored. If reflected energy is received by any one or more of the receiving transducers during the period the receiver is made responsive an associated multivibrator is permitted to operate. Following the transmission of the next sound pulse, the multivibrator is again permitted to operate if a reflected pulse is received during the interval the receiver is made responsive by the gating means. After there has been a predetermined number of cycles of operation of this multivibrator an associated relay is operated to indicate the presence of objects in one or more of the respective detection zones.

Additionally, the usual technique utilized with such systems is to establish the repetition rate for the transmitter in accordance with the expected round trip transit time of a sound pulse reflected from an object at the outermost distance from the transducers. The sound pulse duration is made short with respect to said round trip transit time. This technique enables each sound pulse to "seek" out an object anywhere in the detection zone and be reflected back to a receiving transducer at a time when the receiver has been rendered responsive, i.e., during the time the transmitter is nonoperative.

Under ordinary circumstances, this procedure is highly effective; particularly, when the enviroment of the system is such that the transmitting and receiving transducers may be mounted overhead. Then the receiver may be made responsive for a time interval commensurate with the expected round trip transit time required for the sound energy to be reflected from the lowest and highest object moving through the detection zone with respect to the fixed height of the overhead transducers. In other words, a suitable repetition rate for the transmitting system may be established and the receiving system made non-responsive during a controllable time following emission of each pulse by the transmitter because regardless of how wide the area encompassed by the detection zone, it is only necessary to mount the receiving and transmitting transducers at a fixed height above the surface over which the objects are passing and to establish this height so that a suitable transmission repetition rate, dependent upon the size and the speed of the objects to be detected, may be utilized in order to insure a round trip transit time for each sound pulse such that an object passing through the detection zone will reflect a sufficient number of transmitted pulses to cause the exercise of the desired control. Within practical limitations, it does not matter how remotely located the receiving and transmitting transducers are with respect to the receiving and transmitting equipment. For example, once a reflected sound pulse arrives at the receiving transducer, it is converted to electrical energy and for all practical purposes its reception may be viewed as instantaneous.

However, it is not always possible to employ transducers which are mounted overhead. The cost of the mounting means becomes prohibitive as the surface over which the objects are moving broadens. Also, in many instances local ordinances prohibit their use over broad boulevards and moreover for obvious reasons receiving and transmitting transducers mounted overhead could not be used to detect aircraft moving over wide runways and taxiways. All of the above conditions will dictate a need for a "side fire" mounting of the receiving and transmitting transducers.

For example, if it is desired to detect the presence of aircraft travelling along wide runways or taxiways, the transmitting and receiving transducers would be required to be mounted in "side fire" fashion along the side of the runway or taxiway. Under these circumstances, the whole expanse of the taxiway or runway over which the aircraft are moving, is a measure of the round trip transit time of the sound energy rather than the transducer height with respect to the height of the smallest object to be detected as would be the case for transducers mounted overhead. The usual technique of providing an adequately long period between transmitted pulses to allow the return of a reflected pulse before transmitting another pulse is impractical. The taxiway width and the aircraft speed and size may be such that an aircraft can pass through the detection zone between transmitted pulses. If the period between transmitted pulses is shortened, i.e. the repetition rate is increased to a point where several sound pulses will be transmitted during the course of the round trip transit time of any one given sound pulse detection of the moving aircraft is made possible. However, the shorter period will result in many points on the taxiway from which a reflection returning to the receiving transducer would be coincident with a transmitted pulse. This condition would prevent the detection of aircraft located at all of these aforementioned points. The higher the repetition rate of the transmitter, the greater the number of points on a given expanse of taxiway from which a reflected sound pulse will not effect detection. The lower the repetition rate employed with a given expanse of taxiway, the greater the ease with which a passing aircraft may avoid the transmitted sound energy. This problem is particularly pronounced when it is borne in mind that to cause the detection system to exercise a desired control in response to the presence of an aircraft in the detection area, it is usually required that reflected sound energy be received in response to a predetermined number of successively transmitted pulses.

In order to obviate the aforementioned problems, the present invention proposes to provide sonic detection apparatus and a method of mounting the receiving transducers and the transmitting transducers at predetermined locations with respect to each other and the object to be detected. In order to avoid the exercise of a control in response to the direct reception of sound energy from the transmitting transducers, the receiving transducers are displaced a distance from the transmitting transducers equal to an integral function of the product of the pulse repetition period of the transmitter and the propagation velocity of the sound energy. As used herein, "integral function" indicates the mathematical operation of multiplying a multiplicand by an integer. Under these circumstances, it can be seen that any directly coupled energy will be received by the receiving transducers during a period of the cycle when the transmitter is operative and therefore the receiver will be gated nonresponsive. In order to prevent the failure of the detection apparatus to detect sound energy reflected from an object because the receiver is gated "off" with respect to a given receiving transducer, the present invention proposes displacing at least one other receiving or transmitting transducer from a reference receiving or transmitting transducer a distance with respect to the object to be detected at least equal to the product of the "on" time of the transmitter and the velocity of the sound energy. However, the relative displacement of the additional transducer from the like reference transducer with respect to the object to be detected must not differ by an integral function of the product of the pulse repetition period of the transmitter and the propagation velocity of the sound energy. It can be seen that with the proposed method of locating the transmitting transducer with respect to the receiving transducer directly coupled energy must necessarily be received during a period when the receiver is gated "off" and the reflected sound energy will be received by at least one receiving transducer during a period when the receiver is gated "on."

The purpose of the present invention is to disclose apparatus and a method of increasing the effective detection range of object detection systems of the character described.

One object of the present invention is to disclose a method of displacing the receiving and transmitting transducers of an object detection system of the character described with respect to each other in order to prevent the reception of directly transmitted energy.

Another object of the present invention is to provide an object detection system of the character described which is capable of detecting objects moving in broad expanses of detection area.

A further object of the present invention is to disclose a method of insuring the detection of objects moving over broad expanses of detection area by displacing the receiving and transmitting transducers of an object detection system of the character described, a given distance with respect to each other in reference to an object to be detected.

Other objects, purposes, and characteristic features of this invention will be in part obvious from the accompanying drawings and in part pointed out as the description of the invention progresses.

To simplify the illustrations, the various parts and circuits constituting the embodiment of this invention are illustrated in block form. In describing the invention in detail, reference will be made to the accompanying drawings wherein.

Figure 1:
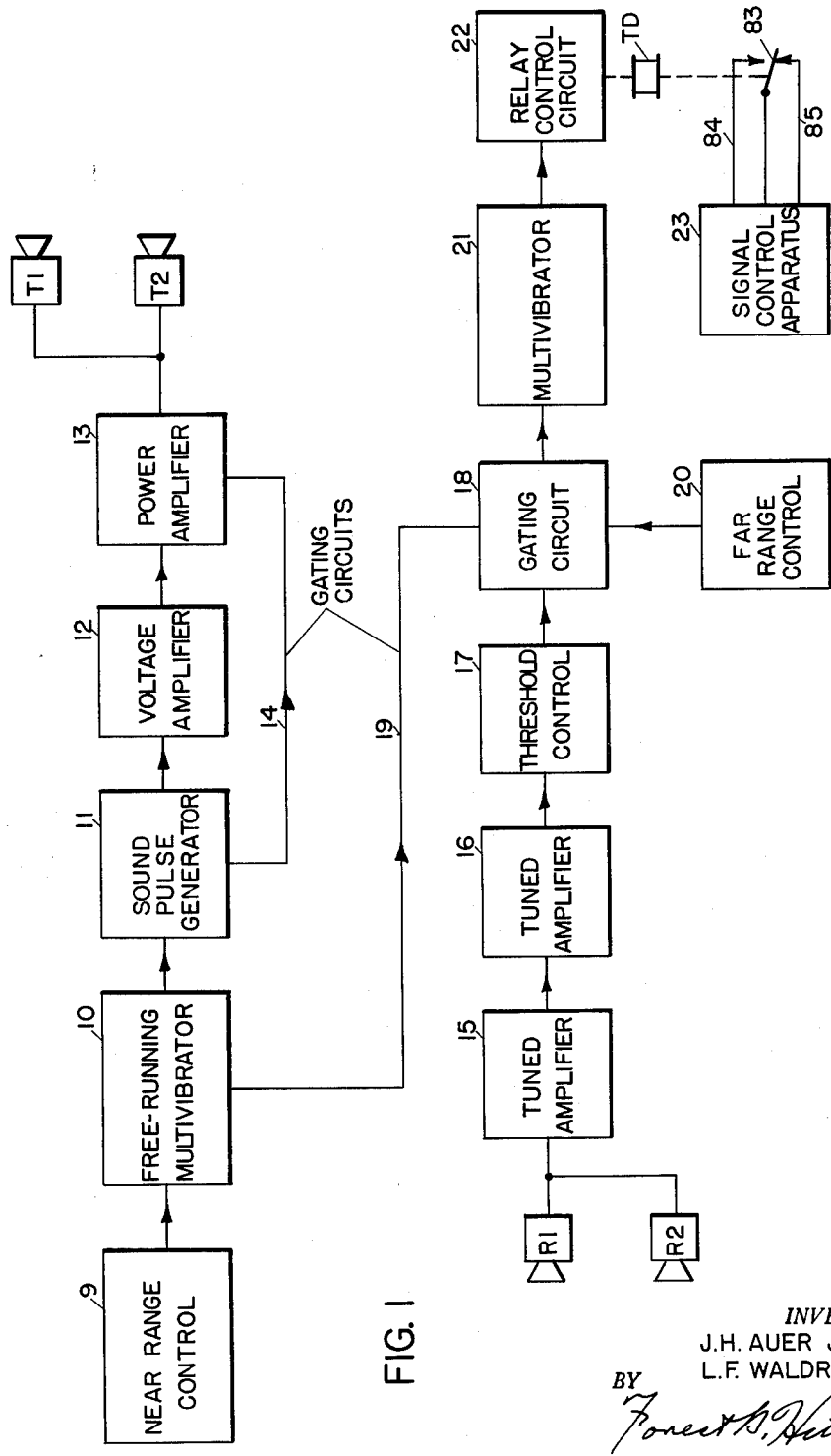
FIG. 1 is a block diagram of an object detection system which may be used to illustrate the present invention.

In the transmitting and receiving organization shown in FIG. 1 the repetition rate of the sound pulses, which are transmitted regularly, is determined by the free-running multivibrator 10. On each cycle of its operation, it produces an output pulse which triggers the associated sound pulse generator 11 into operation so that an electrical signal of an ultrasonic frequency and of fixed, short duration is generated and applied to the voltage amplifier 12. The multivibrator 10 has associated therewith a circuit designated as a near range control 9. The effect of this latter circuit is to demarcate a relatively short interval beginning with the transmission of each sound pulse during which the receiver will be non-responsive to any received signal picked up by a receiving transducer R1 or R2.

Each sound pulse provided by the sound pulse generator 11 is amplified by the voltage amplifier 12 whose output is then applied to the power amplifier 13. A gating circuit represented by the connection 14 between the sound pulse generator 11 and the power amplifier 13 is provided to render the power amplifier 13 operative only at the time of each sound pulse and thus provide a sound pulse of substantial magnitude which is applied to the transmitting transducers T1 and T2.

The receiving circuit comprises a plurality of receiving transducers represented by the transducers R1 and R2. These transducers are all connected in parallel and supply their electrical output signal corresponding to the received sound energy to a tuned amplifier 15 which discriminates against extraneous signals having frequencies other than that of the transmitted sound pulse. The output of amplifier 15 is applied to another similar tuned amplifier 16 whose output, in turn is applied to the threshold control 17 which discriminates against low level interference either electrical or sonic.

The output of the threshold control 17 is applied to a gating circuit 18 which also receives an input over wire 19 from the free running multivibrator 10. This gating circuit demarcates an interval during which bonafide reflection signals from objects can be expected. Its beginning is established by a gating voltage appearing on wire 19 which is obtained from multivibrator 10 and appears a predetermined time after the transmission of each sound pulse as determined by the setting of the near range control 9. The duration of the gating voltage is established by the far range control 20. The effect of this gating circuit 18 is to permit the multivibrator 21 to go into operation for any output of the threshold control 17 provided that it occurs within the limits of the gating voltage demarcated by the gating circuit 18. The multivibrator 21 will restore itself to its original condition prior to the reception of reflections from the next transmitted sound pulse. As a result, the presence of an object in the detection zone which causes any of the parallel receiving transducers to receive reflection pulses will on each successive cycle permit another cycle of operation of the multivibrator 21 to occur. A relay control circuit 22 is arranged to be operated in accordance with the average value of an output signal obtained from the multivibrator 21. A suitable control apparatus such as signal control apparatus 23 is provided to be operated in accordance with the energization and deenergization of the relay TD. Reference may be made to the aforementioned copending application Ser. No. 49,294 of J. H. Auer, Jr., filed August 12, 1960, for specific details as to the structure and mode of operation of this ultrasonic detection system which incidently is assigned to the assignee of the present invention.

Figure 2A:
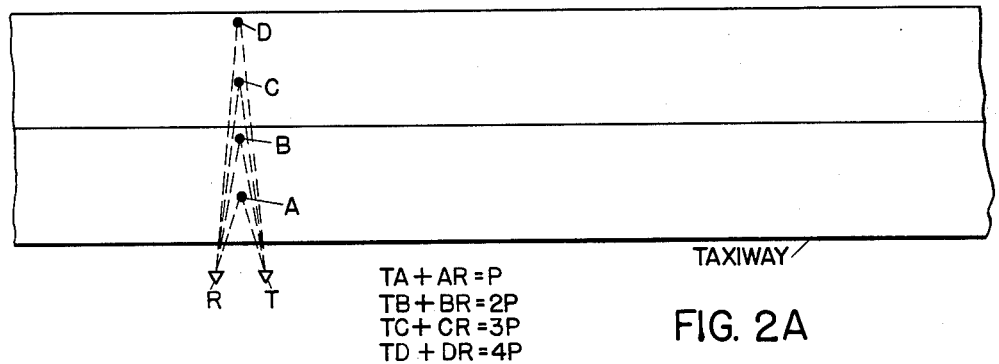
FIG. 2A illustrates one possible arrangement of the receiving and transmitting transducers of a detection system employing transducers of the side fire type.

Referring to FIG. 2A of the drawings, let us assume that it is desired to detect the passage of aircraft moving along a taxiway. For the purposes of easy calculation, let us further assume that the speed of sound in this particular physical environment is 1,000 feet per second and the distance TD, i.e., the distance from the transmitting transducer to the outermost object expected to be detected is 100 ft. If under these conditions, the usual practice is followed, and a transmission cycle is established which allows an adequately long period of "off" time of the transmitter sufficient to allow the return of a reflection before transmitting another pulse, the runway width and aircraft speed and size under these conditions will render detection impractical due to the fact that many aircraft can escape detection because they will reflect an insufficient number of sound pulses back to the receiver to exercise the desired control.

Figure 2B:
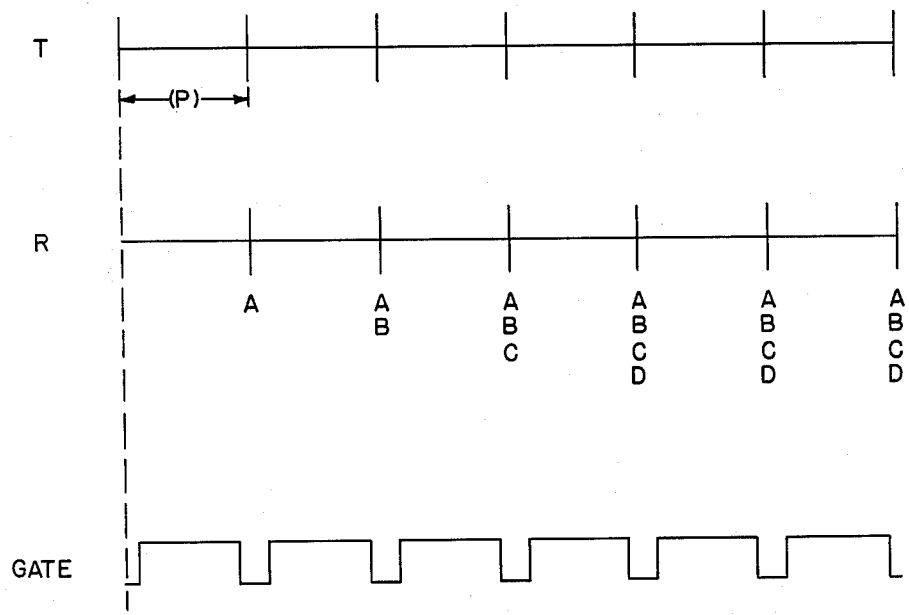
FIG. 2B is a diagrammatic illustration of certain of the transmitted and reflected pulses using the receiving and transmitting transducer arrangement of FIG. 2A.

Specifically, suppose the object at point D is an aircraft moving at 30 miles per hour or 44 feet per second. Under these conditions the "off" time P of the transmitter would be established at 200 milliseconds in accordance with the round trip transit time of a sound pulse travelling a 1,000 feet per second from the transmitting transducer along the line TD and being reflected from the object back to the receiving transducer along the line DR. If the object appeared at the point D, at a time subsequent to 100 milliseconds after the transmission of a pulse and further assuming that three reflections from the aircraft would be sufficient to actuate the receiver, it would then be required that the aircraft be approximately 31 ft. long while travelling at that speed of 30 miles per hour to effect detection. Aircraft smaller than 31 ft. or travelling at a speed in excess of 30 miles per hour would not be detected. Shortening the period to a point where several sound pulses are transmitted during the course of the round trip transit time of a specific reference pulse makes detection possible. However, the shorter period results in points on the taxiway from which a reflection may returned to the receiving transducer at a time when a pulse is being transmitted and the receiver is gated nonresponsive. This condition would prevent detection. Assuming the repetition rate of the transmitter were increased and a period of 20 milliseconds established under the aforementioned conditions, i.e., 100 ft. separating the transducers R and T and the outermost object to be detected, there would be ten points on the taxiway from which a reflection could be returned to the receiving transducer R at a time when the receiver is gated off due to the fact that the transmitter is propagating energy. A few such points are indicated generally in FIG. 2B for a given period and it can be seen that the points of no detection are all integral functions of the basic period established.

For example, assuming P equals 20 milliseconds, the receiver is non-responsive for all pulses reflected from objects where the round trip transit time $TA+AR=20$ milliseconds, $TB+BR=40$ milliseconds, $TC+CR=60$ milliseconds etc. These points are generally indicated diagrammatically in FIG. 2B.

Figure 3A:
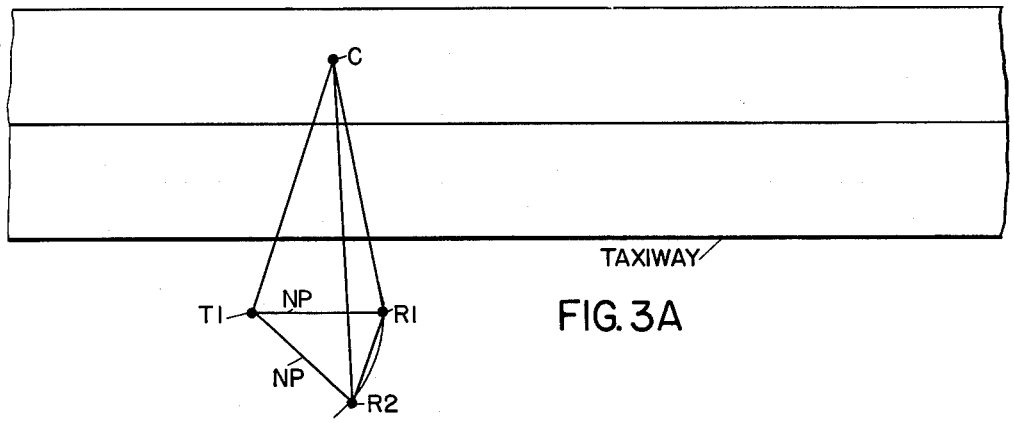
FIG. 3A illustrates the general method of arranging the receiving and transmitting transducers of an ultrasonic detection system employing the invention.
Figure 3B:
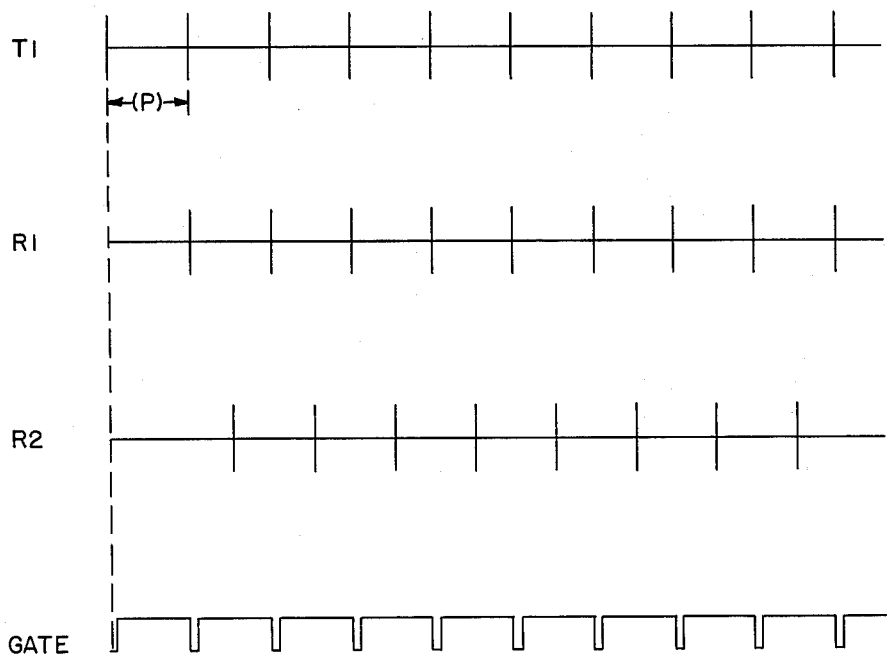
FIG. 3B is a diagrammatic illustration of certain of the transmitted and reflected pulses when the receiving and transmitting transducer arrangement of FIG. 3A is utilized.

FIG. 3A illustrates the general method of eliminating these problems. In the embodiment illustarted in FIG. 3, two receiving transducers R1 and R2 are located on an arc of a circle having a radius equal to the product of an integral function of the pulse repetition period of the transmitter P and the velocity of the propagation sound energy. If sound is assumed to travel at 1000 feet per second, P in milliseconds is directly translatable into distance in feet. If the integer "N" is assumed to be 1, the radius in feet is the equivalent of P in milliseconds. Under these circumstances any energy which is directly received from the transmitting transducer T1 will be received by both the receiving transducers R1 and R2 at a time when the receiver is necessarily gated non-responsive. Thus, a false indication cannot be provided by energy directly received from the transmitter. The exact points on the circle at which R1 and R2 are located are determined with reference to an aircraft located at some point C. In order to avoid the coincident problem inherent in the use of higher repetition rates, it is only necessary to insure that the distance from the object C to the receiving transducer R1 plus an integral function of the period P does not equal the distance CR2, that is, distance CR1 plus a fractional function of the period P equals distance CR2, where the term "fractional function" is used herein to indicate the mathematical operation of multiplying a multiplicand by a fraction. The relationship of the receiving transducers R1 and R2 with respect to an object located at C may be any distance where CR1 differs from CR2 by an amount greater than the product of the time duration of the transmitted pulse and the propagation velocity of the sound energy and is less than the product of the period P of the repetition rate of the transmitter and the velocity of the sound energy. A graphic indication is illustrated in FIG. 3B for a situation where the distance CR1 differs from the distance CR2 by a fractional function equal to one half of the period of the repetition rate of the transmitter P. As can be seen for any reflected pulse returning from the object located at C for which the receiver would be nonresponsive to the transducer located at R1, the receiver must necessarily be responsive with respect to the transducer R2 located a distance $P/2$ away from the receiving transducer R1 with respect to the object at C.

For a given expanse of detection area and a given repetition rate for the transmitter, the points where detection is not possible because the receiver is gated nonresponsive while the transmitter is propagating may be determined by calculation with respect to a given reference receiving transducer and thereafter one or more receiving transducers located in accordance with the principles disclosed herein to insure detection at these points. Other means are available to determine the proper placement of the receiving transducers with respect to the objects to be detected in a given environment. For example, for a specific arrangement of one transmitting transducer and one receiving tronsducer a target board may be placed at various points throughout the detection area and the no-detection points discovered in that manner. Proper placement of the second or more receiving transducers may be determined with respect to these no detection points by use of the same target board.

Figure 4:
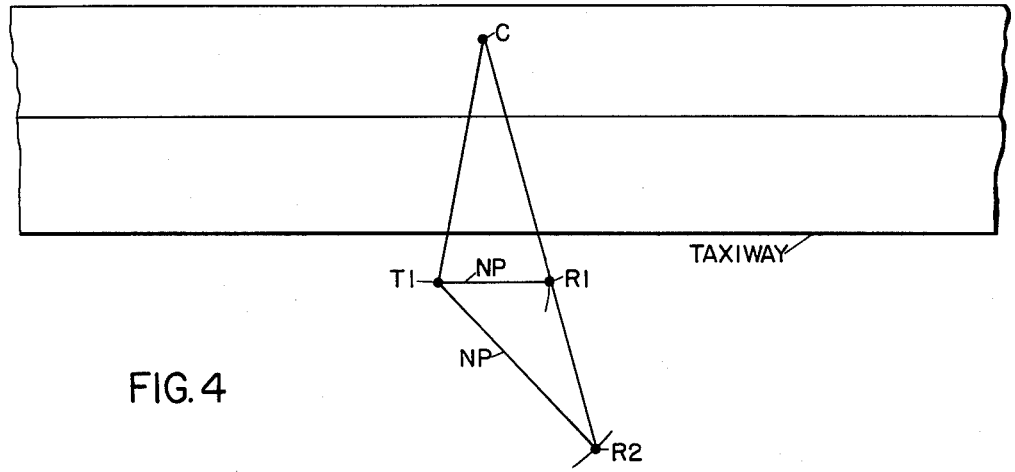
FIG. 4 illustrates one specific arrangement of the receiving and transmitting transducers in accordance with the present invention.

FIG. 4 illustrates a specific configuration utilized in accordance with the principles outlined which requires placement of the receiving transducers R1 and R2 at points on the arcs of two concentric circles separated from a centrally located transmitting transducer at a distance determined by the radii NP of the circles. For any specific radii, it is then necessary to displace the receiving transducers R1 and R2 at points on their respective circles so that the relative distance of the receiving transducers with respect to the object C does not equal an integral function of the period of the repetition rate of the transmitter P in milliseconds translated into distance in feet. Thus for any distance R1R2 corresponding to a mixed-number function of the product of the pulse repetition period multiplied by the velocity of sound translated into distance in feet, detection is insured. As used herein, "mixed-number function" indicates the mathematical operation of multiplying a multiplicand by a mixed-number.

Figure 5:
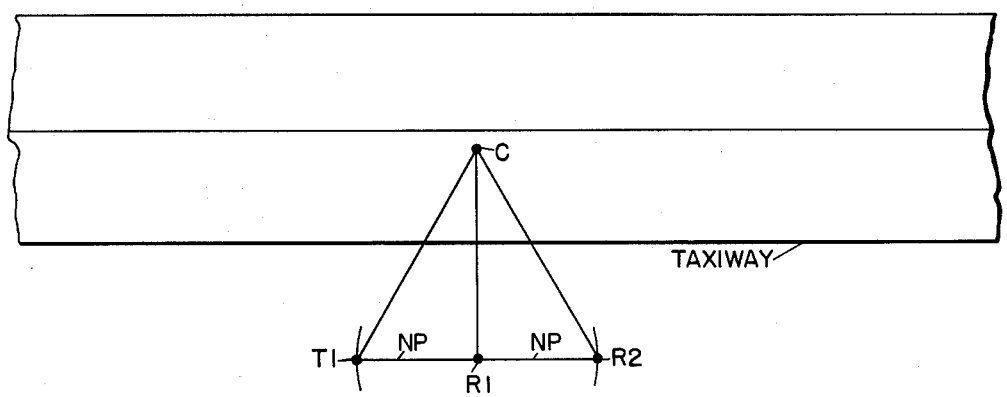
FIG. 5 illustrates specifically a second typical arrangement of the receiving and transmitting transducers of an ultrasonic detection system employing the present invention.

FIG. 5 illustrates another specific configuration employing the general principles of the method and apparatus of the present invention. The receiving transducer R1 is located at the center of a circle whose radius is equal to some integral function of the pulse repetition period of the transmitter P translated into distance in feet. The transmitting transducer T1 and the receiving transducer R2 are located with respect to an object to be detected at points on the perimeter of the circle such that the distance T1C equals CR2. This configuration is particularly effective where the repetition rate of the transmitter is such that the repetition period P of the transmitter is relatively short, thus insuring that the receiving transducers R1 and R2 are sufficiently close together to receive the sound wave reflected from the object in the detection zone. Obviously, the distance CR2 which forms the hypotenuse of a right triangle will always be in excess of the distance CR1. It is then necessary to mount the transducers R1 and R2 at a sufficient distance from the object to be detected to insure that the difference in relative distance between each receiving transducer R1 and R2 with respect to the object C is greater than the product of the "on" time of the transmitter and the velocity of the sound energy but does not equal the product of an integral function of the pulse repetition period of the transmitter and the velocity of the sound energy. Hence, distance CR2 minus distance CR1 must equal a non-integral numerical function of the product of the pulse repetition period and sound propagation velocity, where the term "non-integral numerical function" is used herein to indicate the mathematical operation of multiplying a multiplicand by any number other than a whole number.

The general method of the present invention is relative and although it has been disclosed with respect to the relative placement of receiving transducers with respect to a transmitting transducer, it is obvious that the same principles would be in order if we displaced two transmitting transducers with respect to a given receiving transducer. For example, in FIG. 3 if two transmitting transducers were located at the points designated for the receiving transducers R1 and R2 and the transmitting transducer located at the center of the circle were replaced by receiving transducer, the same conditions would prevail as illustrated for the configuration shown and the arrangement would be just as effective.

Having described in the foregoing specification a method and apparatus for detecting objects over a broad detection area employing ultrasonic detection equipment of the character described, we desire it to be understood that the apparatus shown is merely typical of that which may be constructed to practice the invention, that various other forms, adaptations, and alterations may be made without in any manner departing from the spirit or scope of this invention.

What we claim is:

1. A system for assuring detection of an object comprising, a transmitter, a first number of transducer means coupled to the transmitter for emitting discrete energy pulses at a pre-established repetition rate, a receiver including gating means for rendering said receiver responsive to said pulses for a predetermined duration following emission of each pulse, and a second number of transducer means different from said first number and coupled to said receiver for receiving pulses reflected from said object, each said receiving transducer means being separately located at a distance from the emitting transducer means equal to an integral function of the product of time duration between successively transmitted pulses and propagation velocity of said pulses, at least one of said receiving transducer means being spaced apart from the object by a distance equal to the spacing between any one of the other of the receiving transducer means and the object plus a fractional function of said product, whereby each pulse reflected by the object is received by the receiver.

2. A system for assuring detection of an object comprising,
   a transmitter,
   a transducer coupled to said transmitter for emitting discrete energy pulses at a pre-established repetition rate,
   a receiver including gating means for rendering said receiver responsive to said pulses for a controllable duration following emission of each pulse,
   and a pair of receiving transducers coupled to said receiver for receiving pulses reflected from said object,
       each receiving transducer being separately located on the perimeter of a circle circumscribed about the emitting transducer at a radius equal to an integral function of the product of time duration between successively emitted pulses and propagation velocity of said pulses,
       one of the receiving transducers being spaced apart from the object by a distance equal to the spacing between the other of the receiving transducers and the object plus a fractional function of said product,
   whereby each pulse reflected by the object is received by the receiver.

3. A system for assuring detection of an object comprising,
   a transmitter,
   a transducer coupled to said transmitter for emitting discrete energy pulses at a pre-established repetition rate,
   a receiver including gating means for rendering said receiver responsive to said pulses for a controllable duration following emission of each pulse,
   a first receiving transducer coupled to said receiver for receiving pulses reflected from said object,
       said first receiving transducer being situated at the center of a circle of radius equal to an integral function of the product of time duration between successively emitted discrete energy pulses and propagation velocity of said pulses,
       said emitting transducer being situated on the perimeter of said circle,
   and a second receiving transducer coupled to said receiver for receiving pulses reflected from said object,
       said second receiving transducer being situated on the perimeter of said circle such that said emitting transducer and said second receiving transducer are equidistant from said object and farther from said object than said first receiving transducer by a non-integral numerical function of the product of the pulse repetition period and sound propagation velocity,
   whereby each pulse reflected by the object is received by the receiver.

4. The system of claim 3 wherein both said emitting transducer and said second receiving transducer are additionally situated on a common diameter of the circle.

5. A system for assuring detection of an object comprising,
   a transmitter,
   a transducer coupled to said transmitter for emitting discrete energy pulses at a pre-established repetition rate,
   a receiver including gating means for rendering said receiver responsive to said pulses for a controllable duration following emission of each pulse,
   a first receiving transducer coupled to said receiver for receiving pulses reflected from said object,
       said first receiving transducer being located on the perimeter of a first circle circumscribed about the emitting transducer at a radius equal to a first integral function of the product of time duration between successively emitted pulses and propagation velocity of the pulses,
   and a second receiving transducer coupled to said receiver,
       said second receiving transducer being located on the perimeter of a second circle circumscribed about the emitting transducer at a radius equal to a second integral function of said product,
       said first and second receiving transducers being spaced apart from each other by a mixed-number function of said product,
   whereby each pulse reflected from the object is received by the receiver.

6. A system for assuring detection of an object comprising, a transmitter, a transducer coupled to said transmitter for emitting discrete energy pulses at a pre-established repetition rate, a receiver including gating means for rendering said receiver responsive to said pulses for a controllable duration following emission of each pulse, and a pair of receiving transducers coupled to said receiver for receiving pulses reflected from said object, each receiving transducer being separately located at a distance from the emitting transducer equal to an integral function of the product of time duration between successively transmitted pulses and propagation velocity of said pulses, one of the receiving transducers being spaced apart from the object by a distance equal to the spacing between the other of the receiving transducers and the object plus a fractional function of said product, whereby each pulse reflected by the object is received by the receiver.

7. A system for assuring detection of an object comprising, a transmitter, a pair of transducers coupled to said transmitter for emitting discrete energy pulses at a pre-established repetition rate, a receiver including gating means for rendering said receiver responsive to said pulses for a controllable duration following emission of each pulse, and a single receiving transducer coupled to said receiver for receiving pulses reflected from said object, each emitting transducer being separately located at a distance from said receiving transducer equal to an integral function of the product of time duration between successively transmitted pulses and propagation velocity of said pulses, one of the emitting transducers being spaced apart from the object by a distance equal to the spacing between the other of the emitting transducers and the object plus a fractional function of said product, whereby each pulse emitted by at least one of the emitting transducers is reflected by the object to the receiving transducer.

8. In an object detecting system including transmitting means emitting discrete energy pulses at a pre-established repetition rate and a receiver including gating means rendering said receiver sensitive to reception of said discrete energy pulses for a controllable duration following emission of each pulse, the method of insuring detection of a specific object which comprises the steps of emitting successive pulses from said transmitting means at a controlled repetition rate, receiving pulses reflected from said object at a first point on the perimeter of a circle circumscribed about the transmitting means at a radius equal to an integral function of the product of time duration between successively transmitted pulses and propagation velocity of said pulses, and receiving additional pulses reflected from said object at a second point on said perimeter, said second point being spaced apart from said object by a distance equal to the sum of the spacing between the first point and said object plus a fractional function of said product whereby said receiver is actuated whenever a reflected pulse is received at at least one of said points.

9. In an object detecting system including means emitting discrete energy pulses at a pre-established repetition rate and a receiver including gating means rendering said receiver sensitive to reception of said discrete energy pulses for a controllable duration following emission of each pulse, the method of insuring detection of a specific object which comprises the steps of emitting successive pulses from said transmitting means at a controlled repetition rate, receiving pulses reflected from said object at a point spaced apart from said transmitting means by a distance equal to a first integral function of the product of time duration between successively transmitted pulses and propagation velocity of said pulses, and receiving additional pulses reflected from said object at a point spaced apart from said transmitting means by a distance equal to a second integral function of said product, said second point being spaced apart from said object by a distance equal to the sum of the spacing between said object and said first point plus a non-integral numerical function of said product whereby said receiver is actuated whenever a reflected pulse is received at at least one of said points.

10. The method of claim 9 wherein said first and second integral functions are identical.

11. In an object detecting system including means emitting discrete energy pulses at a pre-established repetition rate and a receiver including gating means sensitizing said receiver to reception of said discrete energy pulses for a predetermined duration following emission of each pulse, the method of insuring detection of a specific object which comprises the steps of emitting successive pulses from said transmitting means at a controlled repetition rate, receiving pulses reflected from said object at a point on the perimeter of a circle circumscribed about the transmitting means at a radius equal to a first integral function of the product of time duration between successively transmitted pulses and propagation velocity of said pulses, and receiving additional pulses reflected from said object at a point on the perimeter of a circle circumscribed about the transmitting means at a radius equal to a second integral function of said product, one of said points being spaced apart from said object by a distance equal to the sum of spacing between the other of said points and said object plus a non-integral numerical function of said product whereby said receiver is actuated whenever a reflected pulse is received at at least one of said points.

12. The method of claim 11 wherein said first and second radii are of identical size.

13. In an object detecting system including means emitting discrete energy pulses at a pre-established repetition rate and a receiver including gating means rendering said receiver sensitive to reception of said discrete energy pulses for a controllable duration following emission of each pulse, the method of insuring detection of a specific object which comprises the steps of emitting successive pulses from said transmitting means at a controlled repetition rate, receiving pulses reflected from said object at a point on the perimeter of a circle circumscribed about the transmitting means at a radius equal to a first integral function of the product of time duration between successively transmitted pulses and propagation velocity of said pulses, and receiving additional pulses reflected from said object at a point on the perimeter of a circle circumscribed about the transmitting means at a radius equal to a second integral function of said product, said points being spaced apart from each other by a distance equal to a mixed-number function of said product whereby said receiver is actuated whenever a reflected pulse is received at at least one of said points.

References Cited by the Examiner

UNITED STATES PATENTS

| | | | |
|---|---|---|---|
| 2,507,121 | 5/50 | Sivian | 340—16 |
| 3,105,953 | 10/63 | Polster | 340—16 |

CHESTER L. JUSTUS, *Primary Examiner.*